Patented Oct. 20, 1925.

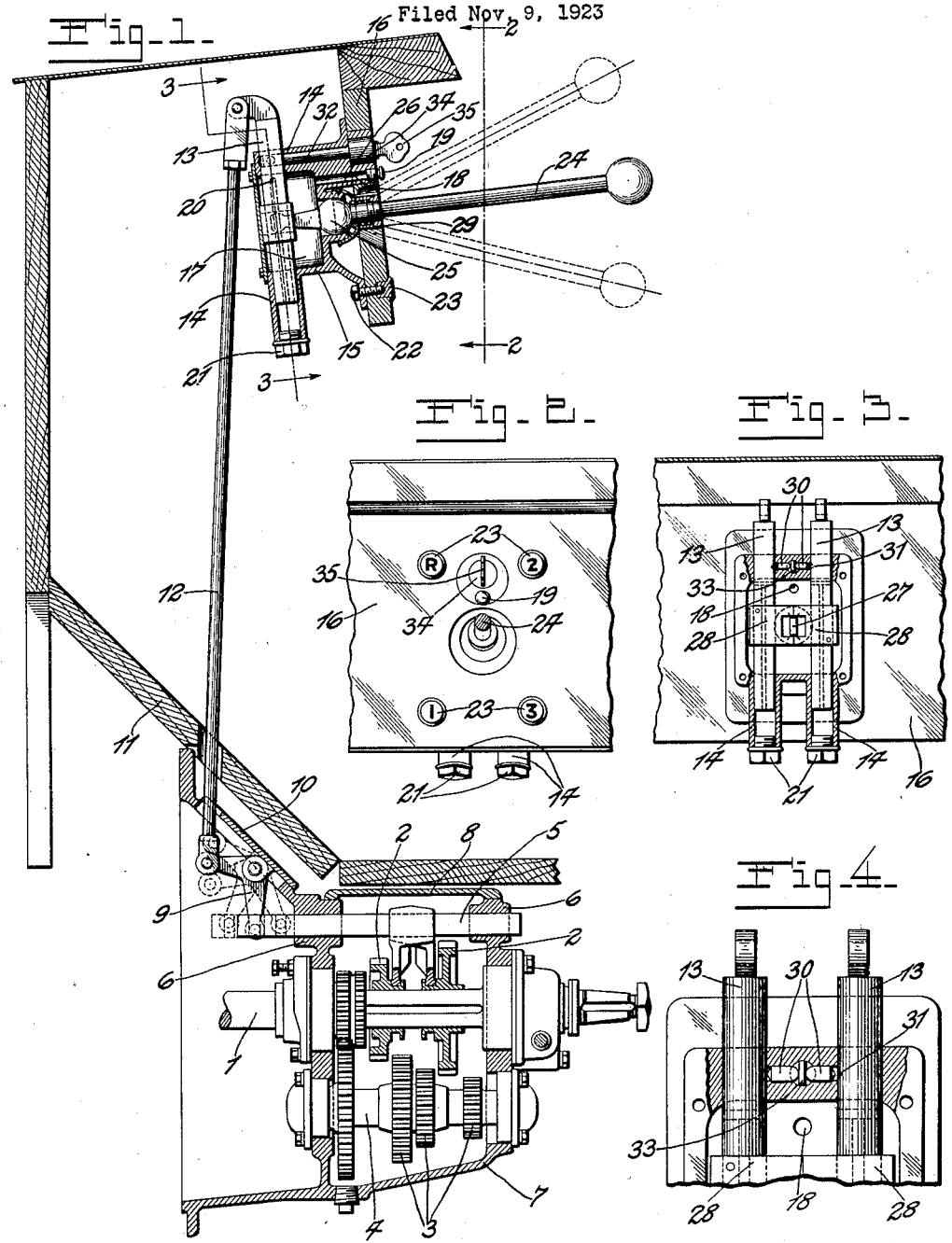

1,558,149

UNITED STATES PATENT OFFICE.

GEORGE P. DORRIS, OF ST. LOUIS, MISSOURI.

VARIABLE-SPEED SHIFT MECHANISM.

Application filed November 9, 1923. Serial No. 673,643.

*To all whom it may concern:*

Be it known that I, GEORGE P. DORRIS, a citizen of the United States, residing at the city of St. Louis and State of Missouri, have invented a new and useful Variable-Speed Shift Mechanism, of which the following is a specification.

This invention relates to mechanism for shifting the variable speed gears of an automobile, and an object of the invention is to improve generally the arrangement and relationship of the shift lever by placing the shift lever and the connections controlled thereby upon the dash or instrument board of the automobile in order to leave the space upon the floor of the automobile clear.

Another object of the invention is to provide a novel and improved mounting for the shift lever designed and adapted to be attached to the front side of the dash or instrument board of the automobile while the shift lever projects rearwardly to a position convenient for operation by the driver of the vehicle.

Another object of the invention is to provide a mechanism of the character last mentioned equipped with an efficient locking device, whereby the shift lever and the connected parts may be locked against operation.

Other objects and advantages of the invention will appear from the following description, reference being made to the drawing in which Fig. 1 shows parts in elevation and other parts in section.

Fig. 2 is a view from the line 2—2 of Fig. 1 showing the rear side of the dash or instrument board with indicia denoting the speeds and direction of travel obtained when the shift lever is in the various indicated positions.

Fig. 3 is a sectional view on the line 3—3 of Fig. 1.

Fig. 4 is a view enlarged in comparison to Fig. 3 showing the locking device for the tranmission mechanism.

The variable speed gearing mechanism shown is of a familiar type in which the clutch shaft 1 supports the shiftable gears 2 for engagement with the several gears 3 on a shaft 4. A pair of rods 5 are supported for sliding movement parallel with the shaft 1 in bearings 6. All of the aforesaid devices are contained in the transmission gear housing 7 provided in the present instance with a removable cover plate 8.

The rods 5 are extended forwardly beyond the front bearing 6. A pair of bell crank levers 9 are pivotally supported by a removable supporting plate 10 located under the inclined footboard 11 and have their lower arms operatively connected with the forward ends of the gear shift rods 5 respectively. From the forwardly extending arm of each of the bell crank levers 9 a rod 12 extends upwardly through holes in the plate 10 and the footboard 11 to pivotal connection with the forwardly extended upper ends of rods 13, said rods 12 being well to the front of the seating portion of the automobile leaving the floor space clear and unobstructed. This arrangement by which clear and unobstructed floor space is obtained is an important feature of the invention. The two rods 13 are mounted for approximately vertical sliding movements in bearings 14 in a supporting housing 15 rigidly attached to the front of the dash or instrument board 16 of the automobile. The chamber 17 in the housing 15 constitutes a lubricant container to which lubricant may be supplied through a passage 18 provided with a closure 19. The lower bearings 14, as clearly shown Fig. 1, constitute wells which become filled with the lubricant so that when the rods 13 are moved to their lower positions the lubricant will be forced up through passages 20 in said rods and thence to lubricate the upper bearings 14 when the rods are moved upwardly. The lower ends of the lower bearings 14 are closed by removable plugs 21.

The housing 15 is secured to the instrument board or dash 16 by screws or bolts 22 passing through the base or flange of the housing and engaging nuts 23 having indicia to denote the various positions of the shift lever.

The shift lever 24 is of the ball pivot type having a ball 25 pivoted in a socket 26 forming a part of the housing 15. The lever 24 extends forwardly through the dash or instrument board of the automobile and has a flat reduced forward extremity 27 for engagement between the arms of the forks 28 on the rods 13, respectively. It is understood that when the shift lever is properly manipulated it may be selectively engaged with the forks 28 to operate either one of the rods 13 and thereby the connections to the transmission gears 2 so as to shift the latter from one position to another in order to obtain the desired forward speed or to back the vehicle as desired. A cap 29 attached to the lever 24 covers the socket 26 but does not interfere with the operation of said lever.

The gear shift mechanism described is complete and includes comparatively few parts in addition to the parts contained in the usual gear shifting mechanisms now in use, and in which the shift lever extends through the floor of the vehicle and constitutes an obstruction. By the present arrangement the shift lever is located entirely out of the way but in a position convenient for operation, leaving the entire seating portion of the automobile open and unobstructed. It is desirable to provide locking means to lock the transmission mechanism. The locking device may be of any approved form one such form being shown. The two locking elements 30 are movable laterally into and out of the notches 31 in the rods 13. The actuator for the locking elements 30 comprises a rotary member 32 having a thin blade portion 33 between the locking elements 30. When the blade 33 extends transversely of the axis of the locking elements 30 the rods 13 may be moved by operation of the lever 24; but when the width of the blade 33 is in line with the axes of the locking elements 30 the latter are held in the notches 33 thereby locking the rods 13 from operation. The part 32 is connected with a rotary lock barrel 34 of familiar construction controllable by a key 35 to lock and to unlock the shift mechanism.

From the foregoing it will be seen that my invention is a wide departure from the usual shift mechanisms now in use and that, without sacrificing any of the present conveniences or advantages, obtains new and additional conveniences and advantages by placing the shift lever at a level more convenient for operation and at the same time leaving the floor open and unobstructed. The particular form and arrangement of the devices constituting the invention may be varied considerably without departure from the principles involved. I do not restrict myself unessentially, but what I claim and desire to secure by Letters Patent is:—

1. The combination with a longitudinally movable gear shifting rod, of a sliding rod supported at an angle with respect to said shifting rod and spaced therefrom, a lever movable into and out of operative connection with said sliding rod, a pivoted lever engaging said shifting rod, and a link having one end pivoted directly to said lever and the opposite end pivoted directly to said sliding rod beyond the point at which said first named lever engages said sliding rod.

2. The combination with a longitudinally movable gear shifting rod, of a bell crank lever connected with said rod, a support, a rod mounted for sliding movements in said support, a link having one end pivoted directly to said bell crank lever and the opposite end pivoted to said sliding rod, and a manipulative lever pivoted in said support and movable into engagement with said sliding rod between the points of connection of said link with said sliding rod and said bell crank lever.

3. The combination with a longitudinally movable gear shifting rod, of a receptacle, bearings in said receptacle, a rod mounted for sliding movements in sad bearings toward and away from said shifting rod, a bell crank lever having one end connected with said shifting rod, a link having its ends pivoted directly to said bell crank lever and to said sliding rod respectively and forming an inflexible connection between them, and a manipulative lever pivoted to said receptacle and movable into and out of engagement with said sliding rod between the points of connection of said link with said sliding rod and said bell crank lever.

4. In an automobile the combination with longitudinally movable variable speed gear shifter rods, and a support extending transversely in front of the upper portion of the seating portion of the automobile, of bell crank levers engaging said rods respectively, approximately vertical sliding rods carried by said support in front thereof, links connecting said bell crank levers with said rods respectively and being located entirely in front of the plane of said support, and a lever extending forwardly beyond said support and rearwardly beyond said support toward the operator of the automobile, and being movable into engagement with said sliding rods respectively.

5. In an automobile the combination with longitudinally movable variable speed gear shifter rods, a support extending transversely in front of the upper portion of the seating portion of the automobile, and an inclined footboard located in front of the plane of said support, of bell crank levers below said footboard engaging said rods respectively, a bearing device attached to the front side of said support, approximately vertical sliding rods mounted in said bearing device, links extending through said footboard and connecting said bell crank levers and said sliding rods respectively and being located wholly in front of the plane of said support, and a lever pivoted in said bearing device and having its front end movable into engagement with said sliding rods respectively and having its rear portion extending rearwardly toward the seat of the operator of the automobile.

6. In an automobile having a floor, the combination with shiftable variable speed gears below the floor, and a rigid support relatively a considerable distance above the floor, of a lever extending forwardly through said support, axially movable rods carried in front of said support, means for operating either of said rods by said lever while the other rod remains stationary, and connections from said rods for operating said gears.

7. In an automobile having a floor, the combination with shiftable variable speed gears below the floor, and a rigid support relatively a considerable distance above the floor, of a lever extending forwardly through said support, axially movable rods carried in front of said supports, means for operating either of said rods by said lever while the other rod remains stationary, connections from said rods for operating said gears, and means on the rear side of said support indicating the relative speeds obtainable in the different positions of said lever.

8. In an automobile having a floor, the combination with shiftable variable speed gears below the floor, a rigid support relatively a considerable distance above the floor, a housing attached to the front side of said support, bearings in said housing, axially movable rods in said bearings, a shift lever pivoted in said housing for moving said rods axially to different adjusted positions, and connections operated by said rods for shifting said gears.

9. In an automobile having a floor, the combination with shiftable variable speed gears below the floor, a rigid support relatively a considerable distance above the floor, a housing attached to the front side of said support, bearings in said housing, axially movable rods in said bearings, a shift lever pivoted in said housing for moving said rods axially to different adjusted positions, connections operated by said rods for shifting said gears, and means for lubricating said bearings automatically and as an incident to the operation of said rods.

10. In an automobile the combination with longitudinally movable variable speed gear shifter rods, of bell crank levers engaging said rods respectively, a lubricant receptacle, downwardly extending bearings in connection with said receptacle, approximately vertical sliding rods mounted in said bearings, passages for conducting lubricant to said bearings from said receptacle and from said bearings to said receptacle, links connecting said levers with said rods respectively, and a lever pivoted in connection with said receptacle for shifting said sliding rods.

GEORGE P. DORRIS.